(12) United States Patent
Xiong et al.

(10) Patent No.: US 6,850,040 B2
(45) Date of Patent: Feb. 1, 2005

(54) CHARGE BOOST BATTERY CHARGING AND PROTECTION CIRCUIT

(75) Inventors: Seng P. Xiong, Dacula, GA (US); Martin H. Ramsden, Lawrenceville, GA (US); Marc B. Riley, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/463,893

(22) Filed: Jun. 19, 2003

(65) Prior Publication Data

US 2004/0257040 A1 Dec. 23, 2004

(51) Int. Cl.[7] ................................................ H02J 7/00
(52) U.S. Cl. ..................................................... 320/134
(58) Field of Search ................................ 320/134, 150; 323/284

(56) References Cited

U.S. PATENT DOCUMENTS

| | | | | |
|---|---|---|---|---|
| 5,815,382 A | | 9/1998 | Saint-Pierre | ................. 363/97 |
| 6,141,193 A | * | 10/2000 | Mercer | ........................ 361/18 |
| 6,667,606 B2 | * | 12/2003 | Oglesbee et al. | ........... 323/284 |
| 6,674,273 B2 | * | 1/2004 | Oglesbee | ..................... 323/284 |
| 6,771,051 B2 | * | 8/2004 | Oglesbee et al. | ........... 320/150 |

* cited by examiner

Primary Examiner—Pia Tibbits
(74) Attorney, Agent, or Firm—Philip H. Burns, IV

(57) ABSTRACT

A circuit and method for charging a rechargeable cell is provided. The circuit includes a voltage regulator coupled serially between a power source and a rechargeable cell. The circuit further comprises a controller capable of both monitoring the power dissipation across the voltage regulator and altering the current flowing through the voltage regulator. When the power dissipation in the voltage regulator exceeds a predetermined threshold, the controller increases the current. Where the power source is a linear transformer, this increase of current will cause the transformer to become loaded. The loading causes the transformer output voltage to fall, thereby reducing the power dissipation in the voltage regulator below the predetermined threshold. If, however, the power dissipation does not fall below the predetermined threshold within a predetermined time following the increase of current, the controller will then reduce the current to a level low enough to cause the power dissipation in the voltage regulator to fall below the predetermined threshold. The circuit and method provide a way to rapidly charge batteries while ensuring that the voltage regulator is not subject to thermal compromise.

9 Claims, 4 Drawing Sheets

CHARGE BOOST BATTERY CHARGING AND PROTECTION CIRCUIT

BACKGROUND

1. Technical Field

This invention relates generally to battery charging and protection circuits, and more specifically to a method and circuit for altering power dissipation during charging to rapidly charge rechargeable batteries while simultaneously protecting the integrity of the charging circuit.

2. Background Art

Electronic devices, including cellular phones, pagers, radios, compact disc players, MP3 players, portable computers, and the like are becoming ever more popular. These devices are gaining popularity due to their portability, derived from the use of rechargeable batteries as a power source. Rechargeable batteries, of course, require a battery charger to charge the battery.

FIG. 1 illustrates a simple battery charger 100 that is well known in the art. The charger 100 consists of a power supply 101, a linear regulator 102, a pass element 103 and a battery cell 104. The power supply 101 provides voltage and current to the battery cell 104. The voltage and current must be regulated by the pass element 103 so as to avoid charging the battery cell 104 too rapidly. The linear regulator 102 performs this regulation by dissipating—as heat—the difference between the power generated by the power supply 101 and the power stored by the battery cell 104.

The problem with this prior art solution is that the pass element 103 can overheat. This is best explained by way of example. For a typical single-cell, lithium battery application, a fully charged battery cell 104 typically registers about 4.2 volts. Thus, to fully charge the battery cell 104, and to give enough headroom for parasitic power losses in the pass element 103 and connecting circuitry, the power supply must be capable of supplying at least 5 volts. A typical battery cell 104 will charge optimally at a current of roughly 1 amp.

The problem arises with the battery cell 104 is fully discharged. A discharged battery cell 104 may register only 2.5 volts. As the power supply 101 would supply energy at a rate of 5 volts at 1 amp, or 5 watts, and the battery cell 104 stores energy at a rate of 2.5 volts at 1 amp, or 2.5 watts, the pass element 103 must dissipate energy at a rate of 2.5 watts. As typical pass elements 103 are packaged in an industry-common TO-220 package, 2.5 watts for extended periods of time may make the pass element 103 quite warm. Extended periods of heat may actually jeopardize reliability by approaching—or even surpassing—the threshold junction temperature of the pass element 103.

The problem is exacerbated when an incompatible power supply 101 is coupled to the circuit. For example, if someone accidentally couples a 12-volt supply to the charger, the pass element 103 may have to dissipate up to 10 watts! This can eventually lead to thermal destruction of the pass element 103.

One solution to this problem is recited in U.S. Pat. No. 5,815,382, issued to Saint-Pierre et al. entitled "Tracking Circuit for Power Supply Output Control". This solution provides a means of reducing the output voltage of a power supply when the battery is in a discharged state, thereby reducing the total output power of the power supply. This, in turn, reduces the amount of power a pass element would need to dissipate.

While this is a very effective solution to the problem, it requires a power supply that both includes a feedback input and is responsive to the input by changing the output voltage. The electronics associated with an adjustable power supply can be more expensive that those found is a simple linear transformer power supply.

There is thus a need for an improved means of regulating temperature in a power-dissipating element like those employed as pass elements in battery charging applications.

DETAILED DESCRIPTION OF THE INVENTION

Figure 1:
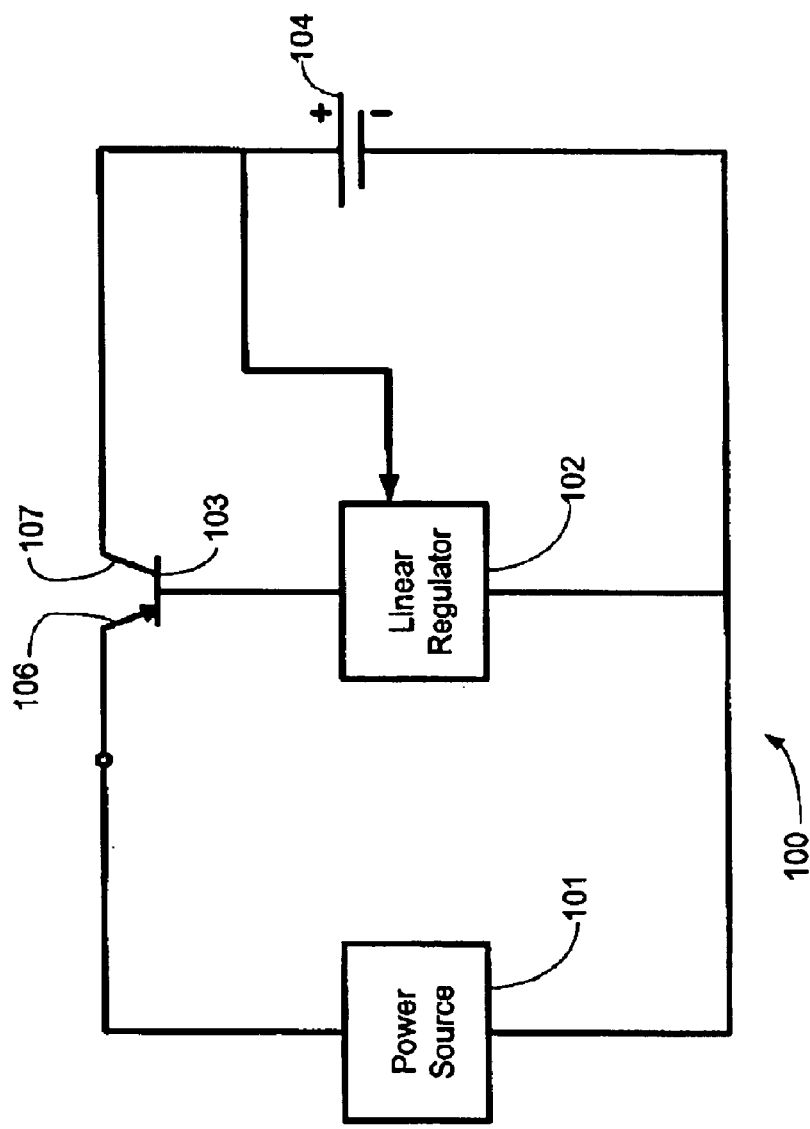
FIG. 1 is an illustration of a prior art charging circuit.

A preferred embodiment of the invention is now described in detail. Referring to the drawings, like numbers indicate like parts throughout the views. As used in the description herein and throughout the claims, the following terns take the meanings explicitly associated herein, unless the context clearly dictates otherwise: the meaning of "a,", "an," and "the" includes plural reference, the meaning of "in" includes "in" and "on."

Prior to turning to the specifics of the invention, it is well to briefly examine the operating regions in which there is a risk of thermal damage to a pass element. This is best explained by looking at battery charging applications, although it will be obvious to those of ordinary skill in the art that the invention may be equally applied to other applications as well.

Figure 2:
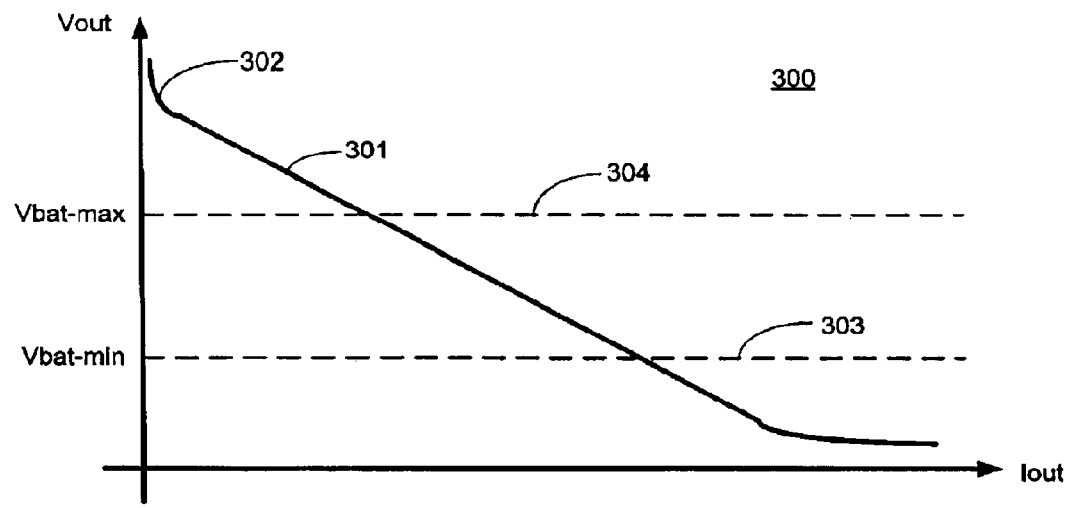
FIG. 2 is an illustration of the characteristic output of a wall transformer power supply.

Referring now to FIG. 2, illustrated therein is the output characteristic 300 for a common power supply, the linear transformer. It may be seen from segment 301 that voltage generally rolls off as current increases. A small peak at segment 302 may be caused by rectification circuitry coupled to the linear transformer that includes diodes and filter capacitors. In any event, the battery charges between the levels Vbatmin 303 and Vbatmax 304.

Figure 3:
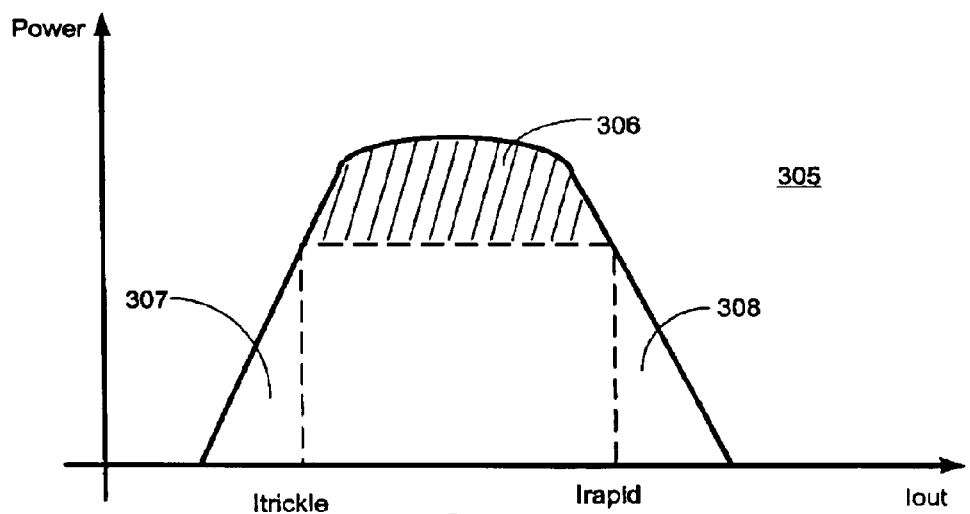
FIG. 3 illustrates a danger zone of operation in accordance with the invention.

Referring now to FIG. 3, illustrated therein is the power generated by the circuit of FIG. 1 when a linear transformer having the output characteristic of FIG. 2 is employed as the power supply. When the battery cell voltage approaches its termination point, Vbatmax 304 of FIG. 2, the voltage of the transformer continues to increase (with the decreasing current flowing to the cell—a result of increasing cell impedance). This increase in the transformer voltage occurs while the battery voltage stays relatively constant. This means that the pass element (103 of FIG. 1) must be able to dissipate the extra power that results from this increasing voltage differential. The extra power dissipation means that the pass element can potentially overheat when within the shaded region 306 of FIG. 3. This region 306 is referred to as the pass element "danger zone". Note that the parabolic power curve of FIG. 3 occurs with any load line device, wherein the term load line means that as the sourced current increases, the output voltage decreases.

To summarize the preceding discussion, there are regions 307,308 of operation in which a battery charger having a pass element works well with no temperature compensation. There is another danger zone 306, however, where pass element reliability may be compromised due to the high power dissipation. It is one object of this invention to provide a circuit that prevents pass elements or other power dissipating elements from entering danger zones.

In its fundamental operation, the invention provides a circuit that monitors power being dissipated in the pass element. When pass element power dissipation enters the danger zone 306, the circuit boosts the current in an attempt to enter region 308, which is a region of safe operation. If, by boosting the current, the circuit is unable to reduce pass element power dissipation, the circuit then reduces the current so as to move into region 307.

The "boosting" of current differs from the prior art, in that prior art circuits teach component protection by monitoring component temperature and reducing the charge current when power dissipation enters the danger zone 306. For example, commonly assigned, co-pending application Ser. No. 10/185,095, filed Jun. 29, 2002, entitled "Thermally Limited Battery Protection and Charging Circuit", teaches a method of reducing the charging current prior to a serial pass element's temperature exceeding a maximum junction temperature. In so doing, the circuit thereby keeps the power dissipation of the pass element below a maximum level.

The present invention takes a contrasting approach, in that when a charge circuit component enters the danger zone 306, the charging circuit increases the current for a limited time, consequently driving the circuit component further into the danger zone 306 in an attempt to eventually pass through the danger zone 306 into safe operating region 308. The circuit monitors the power dissipation in the circuit components during this temporary interval. If the power dissipation falls below a predetermined maximum threshold, then the circuit remains in region 308 by charging with a high current. If the power dissipation of the pass element does not fall, however, the circuit will reduce current so as to move into region 307.

Figure 4:
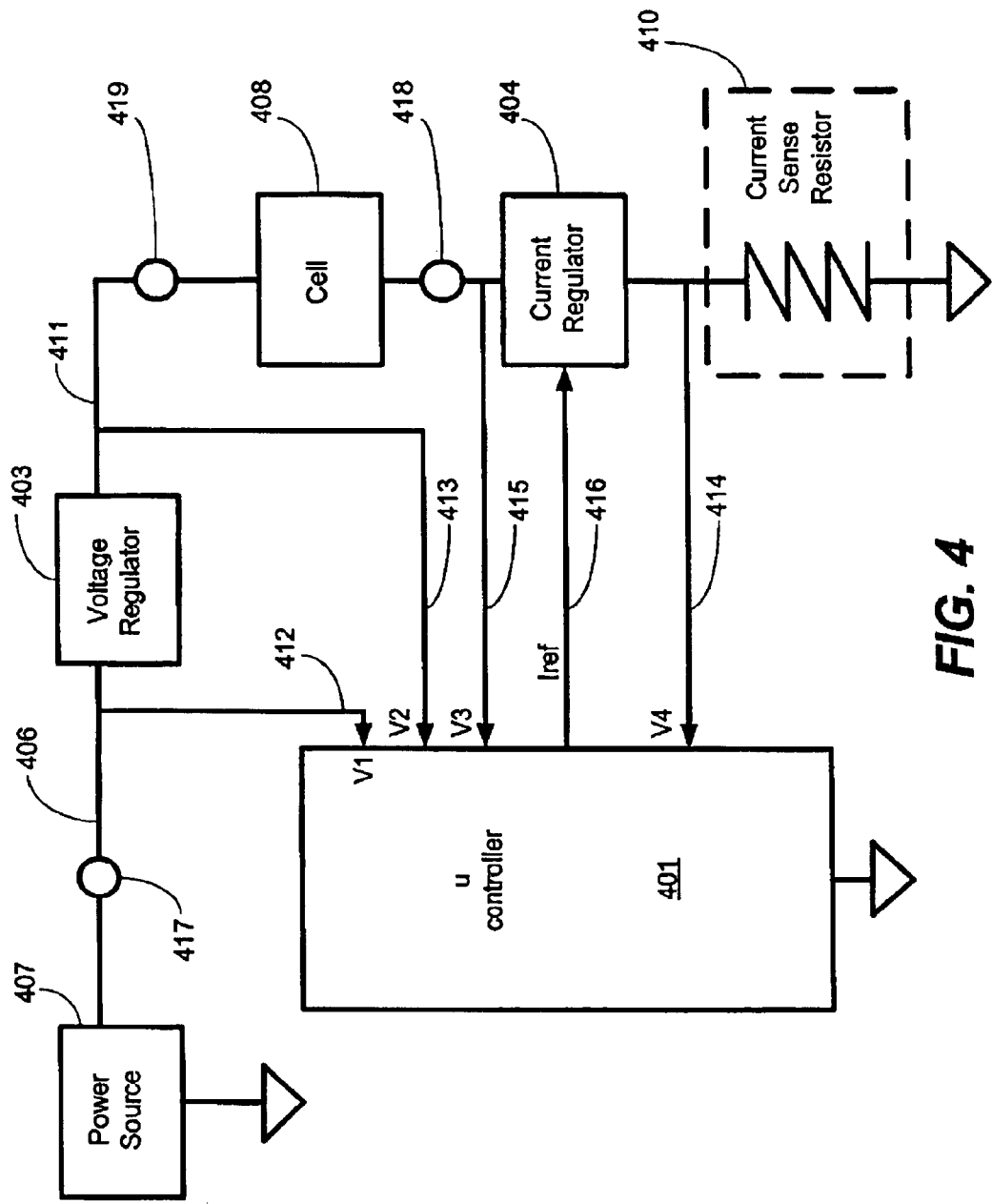
FIG. 4 is an illustration of a charging circuit in accordance with the invention.

Referring now to FIG. 4, illustrated therein is one preferred embodiment of a circuit in accordance with the invention. The fundamental operation of this circuit is recited in commonly assigned, copending application Ser. No. 10/429,070, entitled "Charging Circuit with Two Levels of Safety Protection", filed May 3, 2003, which is incorporated herein by reference for all purposes. It will be clear to those of ordinary skill in the art that the charge boost method recited herein may be applied to a wide variety of charging circuits, so long as there is at least one regulation component coupled serially between the power source and rechargeable cell.

The circuit of FIG. 4 comprises voltage regulator 403, current regulator 404 and a controller 401. Note that the voltage regulator 403 and current regulator 404 may be combined into a single device. Such a single device would need to be coupled serially between the power source 407 and the cell 408. The circuit further comprises a terminal 417 for coupling to a power source 407 and terminals 418,419 for coupling to a rechargeable cell 408, as well as a means for sensing current, like current sense resistor 410. Inputs 412–415 are provided to the controller 401 for sensing voltage and current, as well as an output 416 for controlling the current regulator. (The voltage regulator control is often automatic for lithium cells, although it is easily made adjustable by the controller 401 as is known in the art.)

Figure 5:
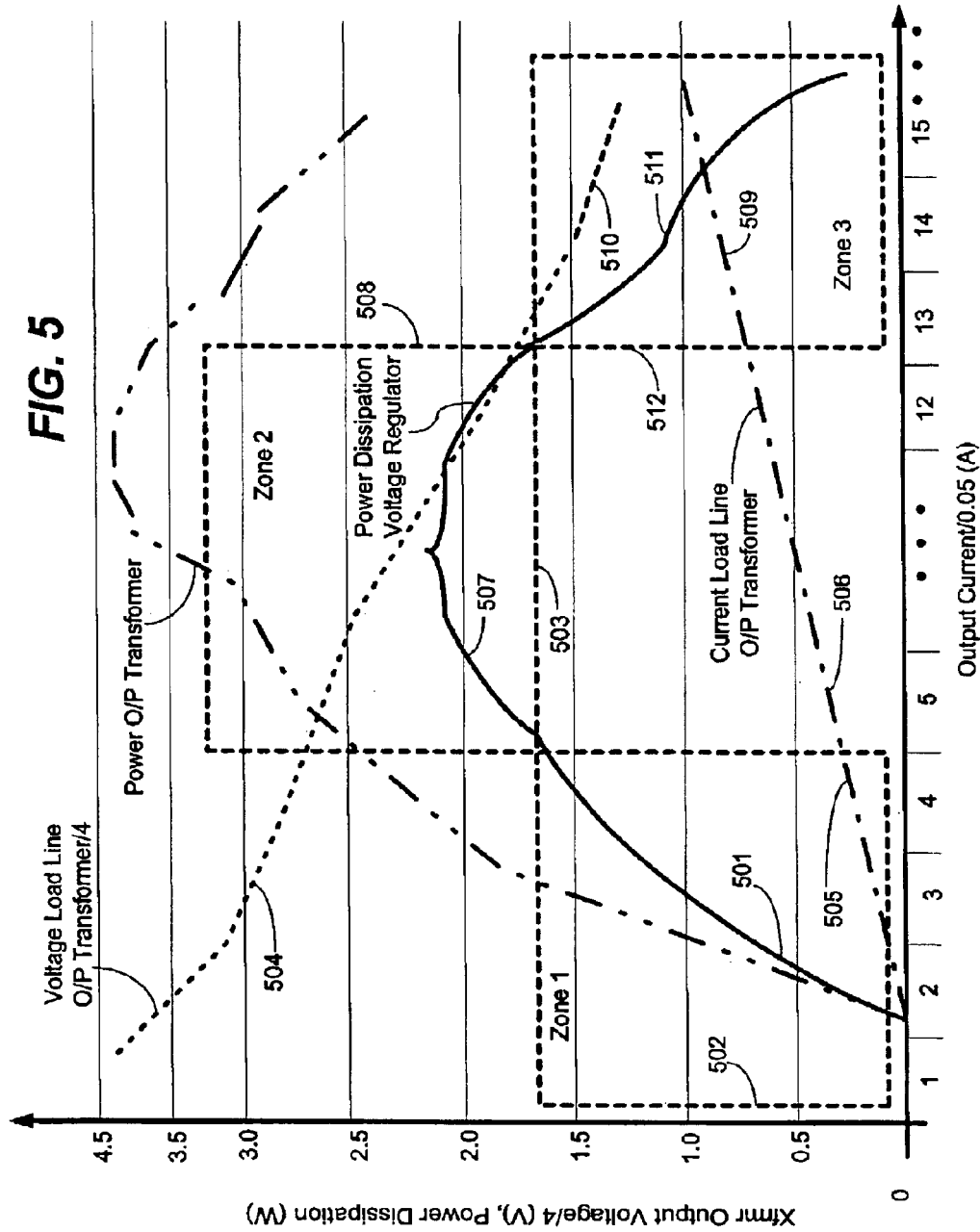
FIG. 5 is a graphical representation of voltage across, current through, and power dissipated in a voltage regulator in accordance with the invention.

Referring now to FIGS. 4 and 5, the charge boost of this invention will be described. When a discharged cell 408 is coupled to the circuit, the controller 401 begins to slowly ramp up the current, monitoring current by way of the current sense resistor 404. The ramping of current is shown as segment 505. Note that the voltage of the discharged cell 408, which may be less than three volts, is substantially lower than the transformer output voltage 504. However, as the current 505 is relatively low, the power dissipation 501 across the voltage regulator 403 remains within region 502. Region 502 is below the maximum power dissipation threshold 503 for the voltage regulator 403, and is thus a safe region of operation. For this exemplary circuit configuration, the voltage regulator 403 is a transistor in a surface-mount, D-package, mounted on a large copper pad, and the corresponding maximum power dissipation threshold 503 is between 1.5 and 1.75 watts.

The controller 401 then continues to increase the current by way of the current regulator 404. This increasing current is shown at segment 506. As the voltage difference between transformer output 406 and cell input 420 is still large, the power dissipation 507 increases above the maximum power dissipation threshold 503 due to the increased current 506 flowing through the voltage regulator 403. This increased power dissipation 507 falls within the danger zone 508. The voltage regulator 403 is unable to operate with a power dissipation level 507 in the danger zone 508 for an extended period of time.

Rather than reducing the current, the controller 401 of the present invention continues to increase the current to level 509 by way of the current regulator 404. The controller 401 maintains the increased current 509 for a predetermined time, like 5 seconds for example, and preferably not more than 10 seconds. If the power source 407 is a linear transformer sized proportionally to the charging circuit, the voltage at the output 406 will drop to segment 510 due to the increased current load. This decrease in voltage causes the power dissipation 511 across the voltage regulator 403 to fall below the maximum dissipation threshold 503 into a second safe region 512.

If the power dissipation across the voltage regulator 403 does not fall into the second safe region 512, and instead remains above the maximum power dissipation threshold 503 for at least the predetermined lime, the controller 401 infers that the power source 407 is something other than a linear transformer. The controller 401 then, upon expiration of the predetermined time, reduces the current until the power dissipation across the voltage regulator falls below the maximum power dissipation threshold 503 into the first safe region 502. One exemplary method for achieving this charging algorithm is as follows: The operating code embedded in the controller 401 instructs the controller 401 to rapidly ramp the current while continuing to monitor the power dissipation across the voltage regulator 403. For example, in a single cell application, the controller may increase current in large intervals, like 200 mA/s. At this rapid rate of increase, the controller 401 will most likely detect the voltage regulator 403 entering the danger zone during the first or second current increment. The controller 401 notes such an event in memory.

The controller 401 continues to rapidly increase the current. As the current increase is so very rapid, the current reaches a maximum value within a short period of time. The controller 401 then senses whether the power dissipation across the voltage regulator 403 has fallen into safe region 512. If it has, the controller 401 will maintain the high level of charging current. If the power dissipation across the voltage regulator 403 has not fallen into safe region 512, then the controller 401 will decrement the current so as to operate in the first safe region 502.

By way of example, assume a 3 watt transformer rated for a nominal 9 volt, 500 mA output. When the controller 401 ramps the charge current 505 to a level of 100 mA, the corresponding output voltage of the transformer 504 is roughly 15 V. Assuming a regulated voltage regulator 403 output voltage of 4.2 V, the power dissipation 501 across the voltage regulator 403 is approximately 1 W, well within the first safe region 502. Note that the exemplary circuit of FIG. 4 utilizes a voltage regulator 403 that continually regulates to 4.2 V on the cell side. The circuit also uses a current regulator 404 configured in a low side topology (meaning that the current regulator is coupled between the cell 408 and ground). However, the current regulator 404 may be located at the high side (between the power source and the cell) where its power dissipation would be small, or may be integrated into the voltage regulator 403. In such cases, the voltage regulator 403 would track the voltage of the cell to 4.2 volts, for single cell applications. The calculations used in this example are easily adjustable by those of ordinary skill in the art using Kirchoff's laws to disregard the power dissipation in the current regulator 404. Note also that each different transformer will have a different load line response.

The controller 401 continues to increase the current. (In this exemplary embodiment, the controller 401 increases the current by way of the current regulator 404, although it will be obvious to those of ordinary skill in the art that other methods of increasing the current will work equally well.) When the current 506 reaches a level of about 500 mA, the corresponding transformer output voltage is roughly 9 V. Again, with a voltage regulator output of 4.2 V, the power dissipation 507 across the voltage regulator 403 is over 2 W, which is above the maximum power dissipation threshold 503 and within the danger zone 508.

The controller 401 then increases the current 509 to something more than 700 mA, which causes the transformer to become loaded, thereby causing the output voltage 510 to fall to roughly 4 V. The corresponding power dissipation 511 of the voltage regulator 403 falls to approximately 1.2 W, well within safe region 512.

If, however, the power dissipation across the voltage regulator 403 fails to fall within safe region 512 within a predetermined time that is determined by the package of the voltage regulator 403, then the controller 401 will reduce the current to a level below 250 mA. This causes the power dissipation across the voltage regulator 403 to fall within safe region 502. Note that the values used in the preceding paragraphs are exemplary only, and will vary depending upon transformer size, circuit topology and component selection. This method is easily implemented in a firmware operating code stored within the controller 401.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment of the invention is to protect the voltage regulator from thermal damage, the invention is not so limited. The invention could be applied to the current regulator, overall circuit or both to prevent thermal damage to components other than the voltage regulator. To modify the application, one would simply change the maximum power dissipation threshold depending upon the package type of the component involved.

What is claimed is:

1. A circuit for charging a rechargeable cell, comprising:
    a. a means for receiving power from a source;
    b. a means for coupling to at least one rechargeable cell;
    c. a means for regulating voltage coupled serially between the means for receiving power and the means for coupling to at least one rechargeable cell; and
    d. a controller capable of varying a current flowing through the circuit;
    wherein when the power dissipation in the means for regulating exceeds a predetermined threshold, the controller increases the current.

2. The circuit of claim 1, wherein if the power dissipation in the means for regulating fails to fall below the predetermined threshold within a predetermined time, the controller reduces the current.

3. The circuit of claim 2, wherein the reduction of current is sufficient to cause the power dissipation in the means for regulating to fall below the predetermined threshold.

4. The circuit of claim 3, wherein the predetermined time is less than 10 seconds.

5. The circuit of claim 2, further comprising a current regulator coupled to the controller.

6. The circuit of claim 5, further comprising a current sense resistor coupled serially with the means for coupling to at least one rechargeable cell.

7. A method of charging a battery, the method comprising the steps of:
    a. providing a circuit comprising:
        i. a means for receiving power from a source;
        ii. a means for coupling to at least one rechargeable cell;
        iii. a means for regulating voltage coupled serially between the means for receiving power and the means for coupling to at least one rechargeable cell; and
        iv. a controller capable of varying a current flowing through the circuit;
    b. increasing a current flowing through the means for regulating;
    c. sensing a power dissipation in the means for regulating; and
    d. increasing the current when the power dissipation in the means for regulating exceeds a predetermined threshold.

8. The method of claim 7, further comprising the step of reducing the current if the power dissipation in the means for regulating fails to fall below the predetermined threshold within a predetermined time following the increasing of current.

9. The method of claim 8, wherein the predetermined time is less than 10 seconds.

* * * * *

UNITED STATES PATENT AND TRADEMARK OFFICE
CERTIFICATE OF CORRECTION

PATENT NO. : 6,850,040 B2
DATED : February 1, 2005
INVENTOR(S) : Xiong et al.

It is certified that error appears in the above-identified patent and that said Letters Patent is hereby corrected as shown below:

Title page,
Item [74], *Attorney, Agent or Firm*, reads "Philip H. Burns, IV" and it should read -- Philip H. Burrus, IV --.

Signed and Sealed this

Third Day of May, 2005

JON W. DUDAS
*Director of the United States Patent and Trademark Office*